United States Patent
Han

(10) Patent No.: US 10,225,394 B2
(45) Date of Patent: Mar. 5, 2019

(54) MOBILE TERMINAL AND METHOD FOR CONTROLLING THE SAME

(71) Applicant: LG ELECTRONICS INC., Seoul (KR)

(72) Inventor: Jechan Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 69 days.

(21) Appl. No.: 15/508,405

(22) PCT Filed: Mar. 4, 2015

(86) PCT No.: PCT/KR2015/002103
§ 371 (c)(1),
(2) Date: Mar. 2, 2017

(87) PCT Pub. No.: WO2016/085049
PCT Pub. Date: Jun. 2, 2016

(65) Prior Publication Data
US 2017/0302786 A1    Oct. 19, 2017

(30) Foreign Application Priority Data
Nov. 24, 2014  (KR) .................. 10-2014-0164735

(51) Int. Cl.
*G06F 3/0481* (2013.01)
*H04M 1/725* (2006.01)
(Continued)

(52) U.S. Cl.
CPC .... *H04M 1/72583* (2013.01); *G06F 3/04817* (2013.01); *H04M 1/72519* (2013.01);
(Continued)

(58) Field of Classification Search
CPC ......... H04M 1/72583; H04M 1/72519; H04M 1/2522; H04M 1/72569; H04W 76/10; H04W 88/06
(Continued)

(56) References Cited

U.S. PATENT DOCUMENTS 9,282,514 B2 *  3/2016  Mathias ............... H04W 48/18
9,319,970 B2 *  4/2016  Liu ....................... H04W 48/16
(Continued)

FOREIGN PATENT DOCUMENTS

| KR | 10-2014-0042775 A | 4/2014 |
| KR | 10-2014-0077929 A | 6/2014 |
| KR | 10-2014-0124844 A | 10/2014 |

*Primary Examiner* — Sonny Trinh
(74) *Attorney, Agent, or Firm* — Birch, Stewart, Kolasch & Birch, LLP

(57) ABSTRACT

A mobile terminal includes a wireless communication unit configured to execute a data communication task through a default communication module selected from at least one communication module; a display unit configured to display at least one object corresponding to the at least one communication module when a preset condition is met in association with a preset data communication task; and a controller configured to control, in response to a user input applied to select at least one of the at least one object, the preset data communication task to be executed through a communication module corresponding to the selected at least one object, and other data communication tasks, except for the preset data communication task, to be executed through the default communication module. Further, the display unit displays at least one icon corresponding to the at least one communication module when the preset condition is met.

18 Claims, 11 Drawing Sheets

(51) Int. Cl.
*H04W 76/10* (2018.01)
*H04W 8/18* (2009.01)
*H04W 88/06* (2009.01)
*H04W 28/08* (2009.01)
*G06F 3/0484* (2013.01)
*G06F 3/0488* (2013.01)

(52) U.S. Cl.
CPC ... *H04M 1/72522* (2013.01); *H04M 1/72569* (2013.01); *H04W 8/18* (2013.01); *H04W 28/08* (2013.01); *H04W 76/10* (2018.02); *H04W 88/06* (2013.01); *G06F 3/0488* (2013.01); *G06F 3/04842* (2013.01)

(58) Field of Classification Search
USPC ............... 455/550.1, 552.1, 432.1, 432.3
See application file for complete search history.

(56) References Cited

U.S. PATENT DOCUMENTS

| | | | |
|---|---|---|---|
| 9,904,918 B2* | 2/2018 | Jo | H04W 4/04 |
| 9,954,787 B2* | 4/2018 | Zhang | H04W 76/27 |
| 2009/0247218 A1* | 10/2009 | Lee | H04W 16/14 |
| | | | 455/553.1 |
| 2012/0059905 A1* | 3/2012 | Kim | G06F 17/30899 |
| | | | 709/217 |
| 2013/0078977 A1 | 3/2013 | Anderson et al. | |
| 2013/0210415 A1 | 8/2013 | Mathias et al. | |
| 2013/0210481 A1* | 8/2013 | Sane | H04W 48/18 |
| | | | 455/552.1 |
| 2013/0272260 A1 | 10/2013 | Bitran et al. | |
| 2015/0052442 A1* | 2/2015 | Li | H04L 41/0846 |
| | | | 715/735 |
| 2016/0255459 A1* | 9/2016 | Sarkar | H04W 4/80 |
| | | | 455/41.1 |

* cited by examiner

[Fig. 1a]
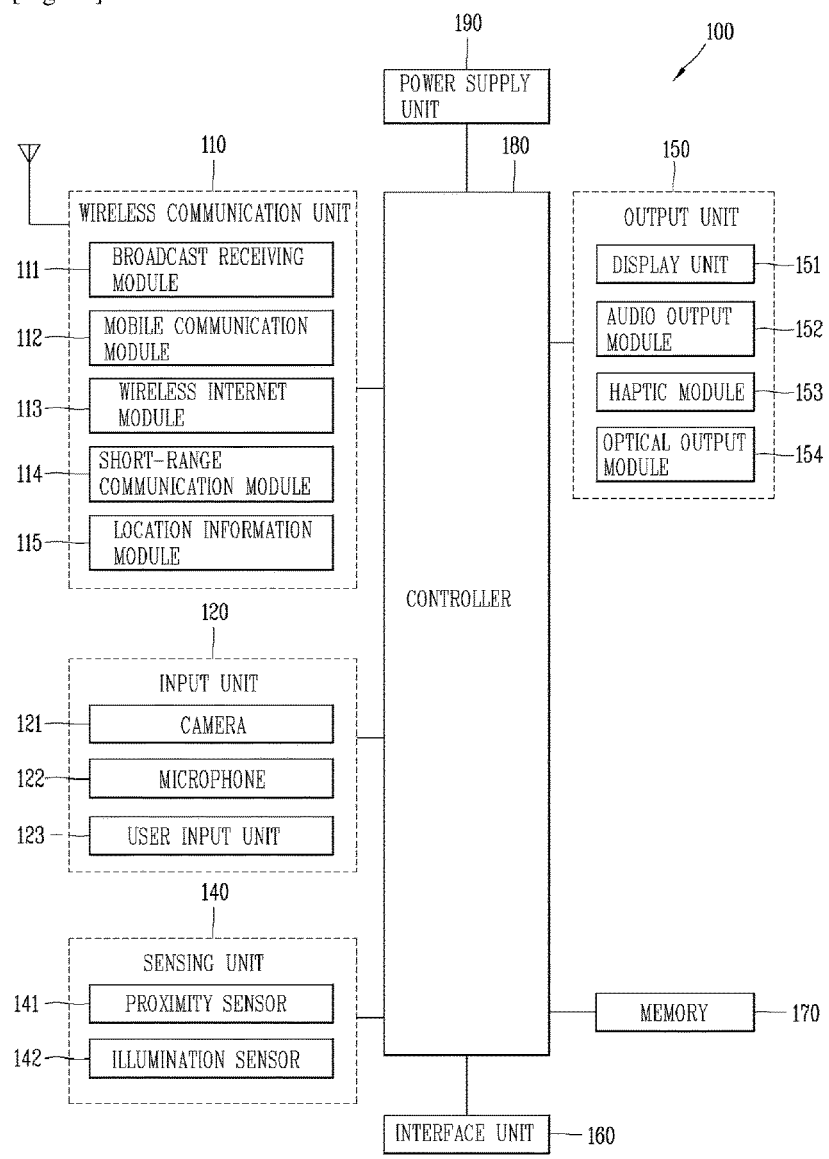
[Fig. 1b]
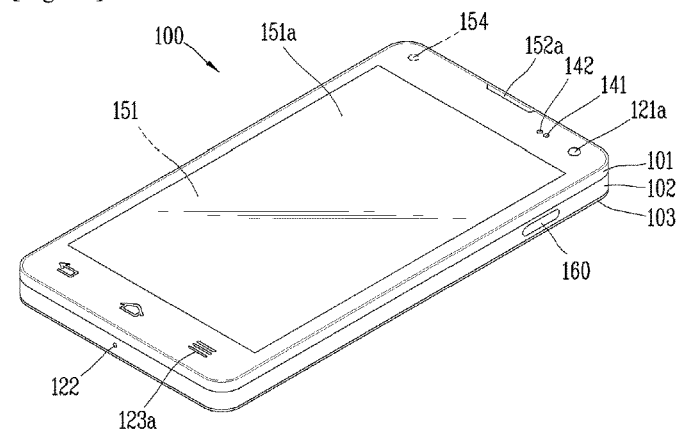

[Fig. 1c]
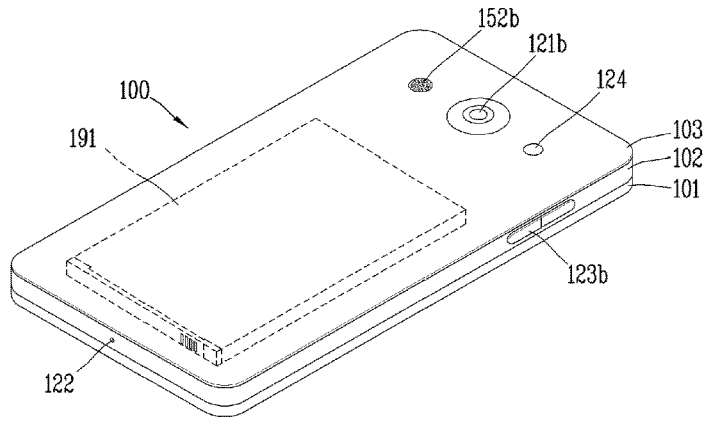
[Fig. 2]
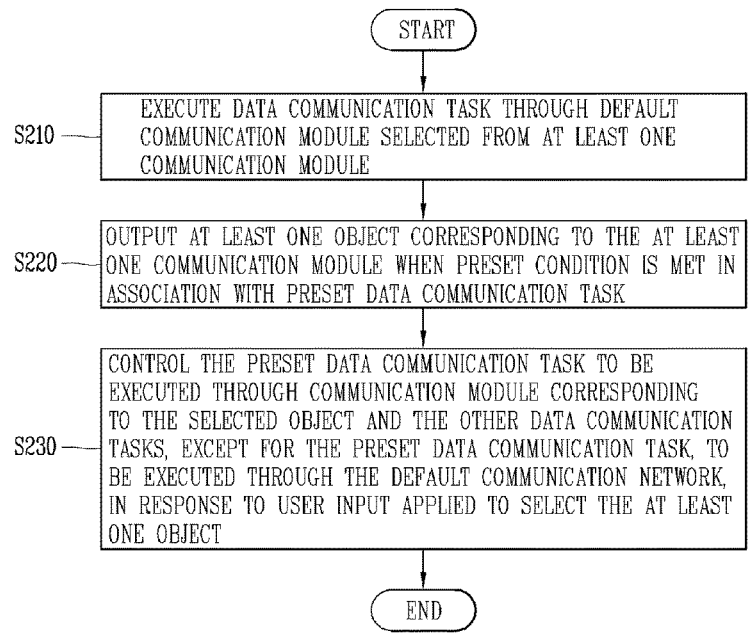
[Fig. 3a]
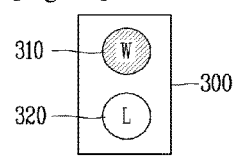
[Fig. 3b]
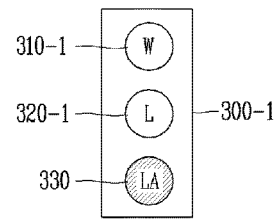

[Fig. 3c]
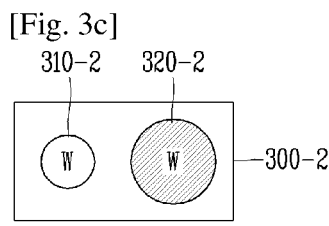
[Fig. 3d]
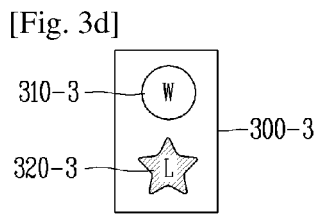
[Fig. 4a]
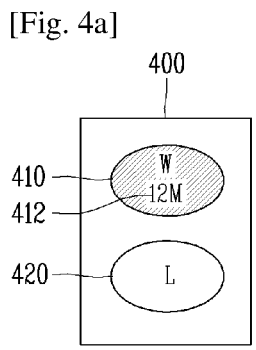
[Fig. 4b]
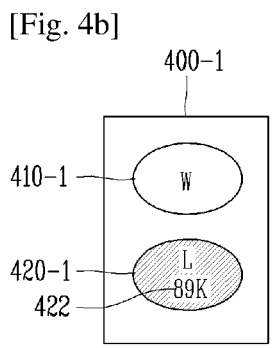
[Fig. 4c]
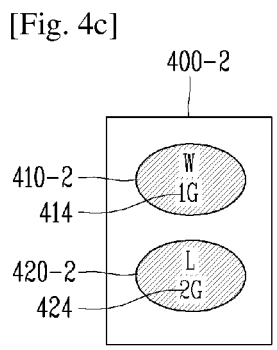

[Fig. 5a]
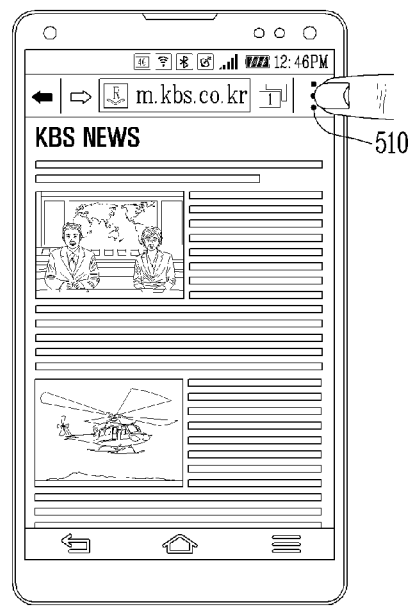
[Fig. 5b]
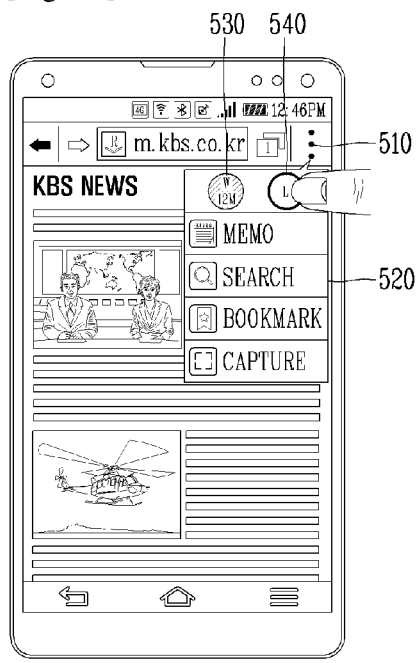

[Fig. 5c]
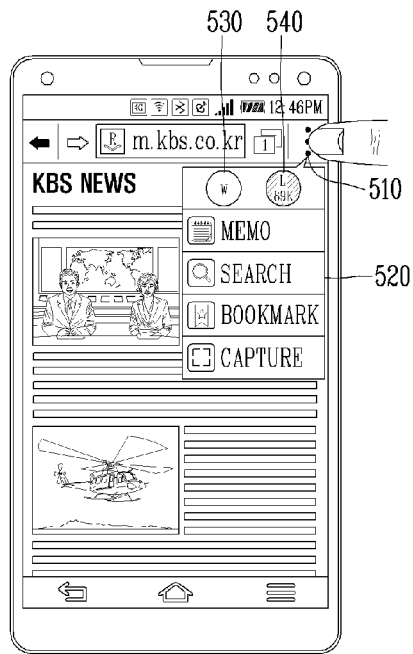
[Fig. 6a]
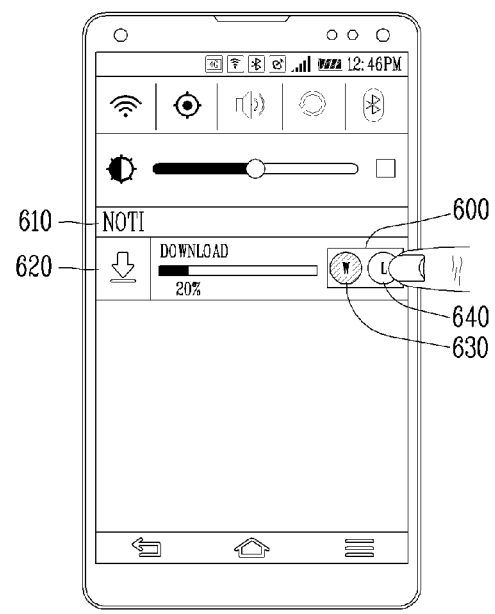

[Fig. 6b]
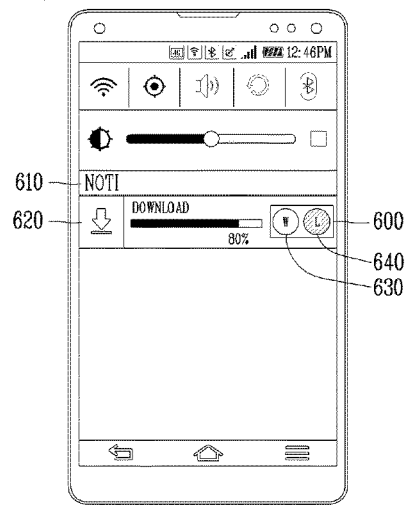
[Fig. 6c]
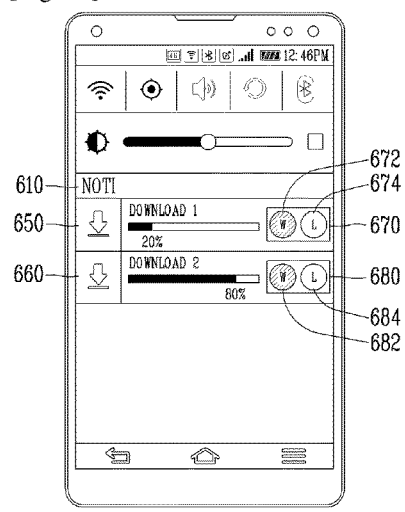
[Fig. 6d]
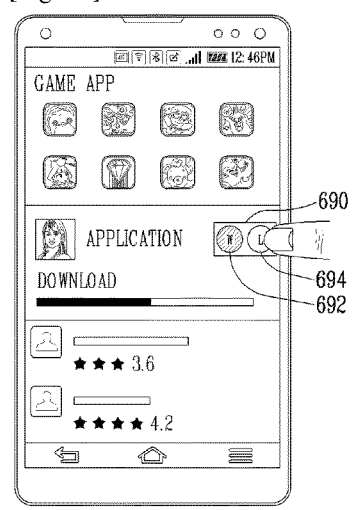

[Fig. 7a]
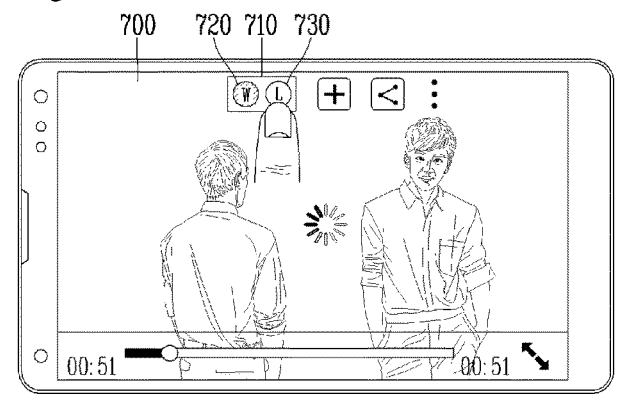
[Fig. 7b]
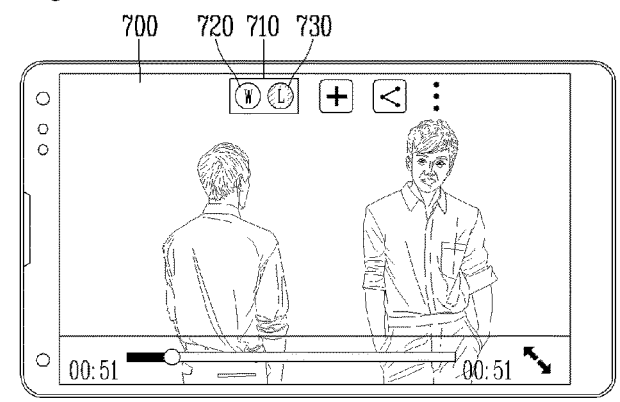
[Fig. 8a]
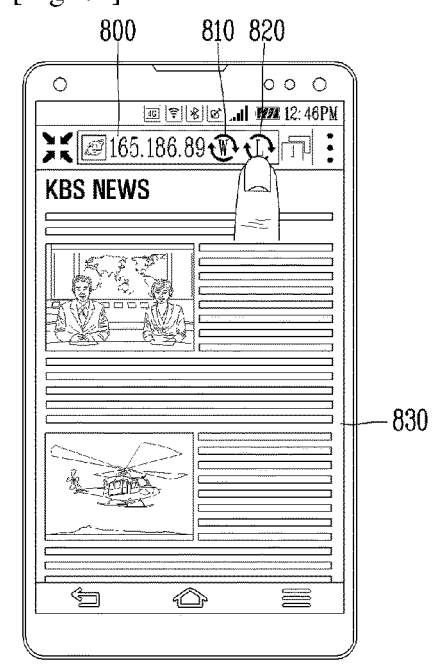

[Fig. 8b]
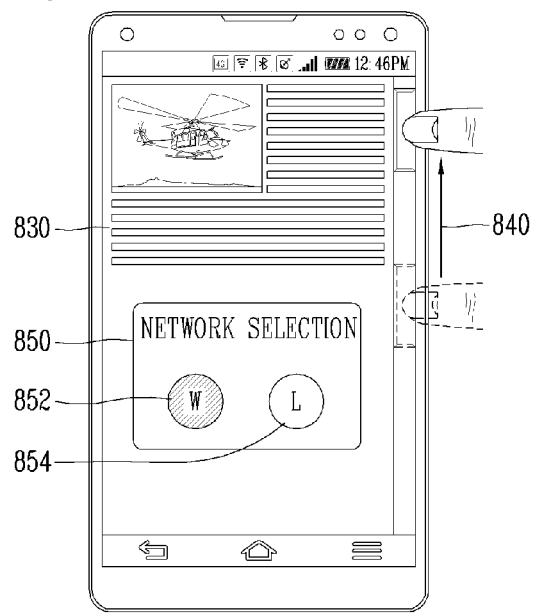
[Fig. 8c]
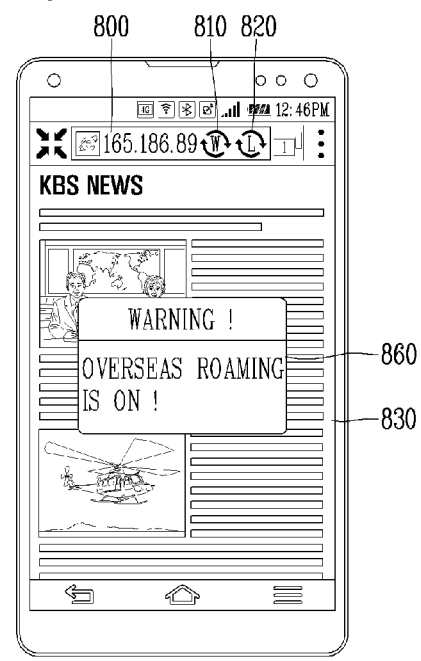

[Fig. 9a]
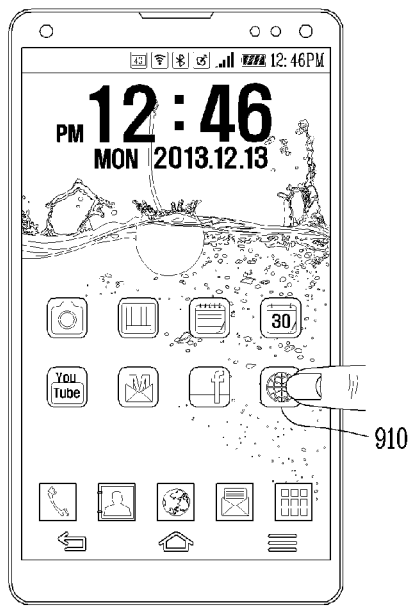
[Fig. 9b]
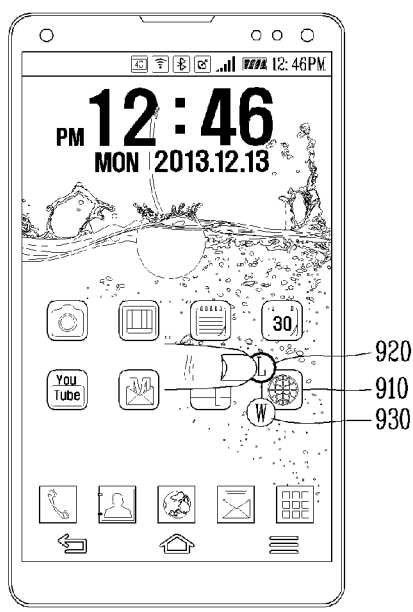

[Fig. 9c]
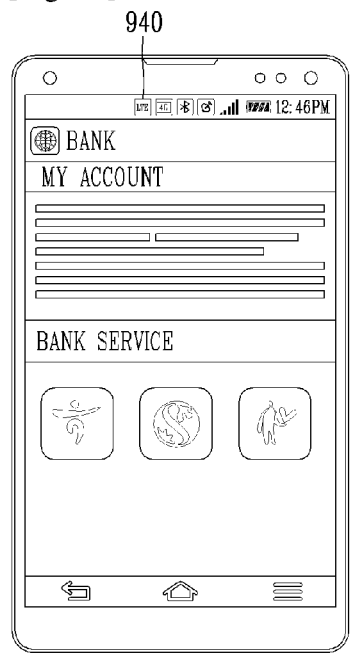
[Fig. 10a]
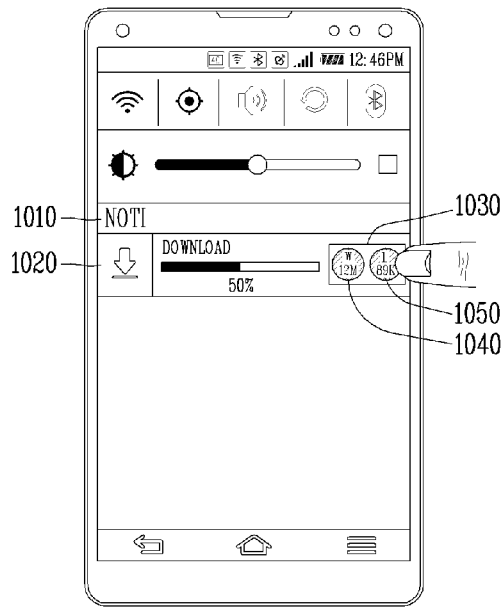

[Fig. 10b]
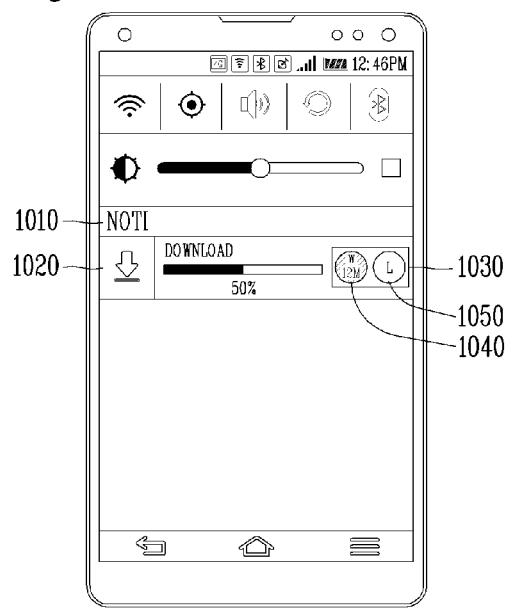
[Fig. 11]
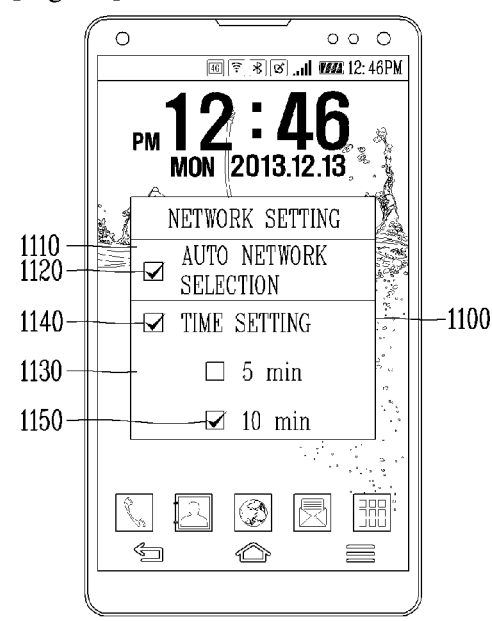

MOBILE TERMINAL AND METHOD FOR CONTROLLING THE SAME

CROSS REFERENCE TO RELATED APPLICATIONS

This application is the National Phase of PCT International Application No. PCT/KR2015/002103, filed on Mar. 4, 2015, which claims priority under 35 U.S.C. 119(a) to Patent Application No. 10-2014-0164735, filed in Republic of Korea on Nov. 24, 2014, all of which are hereby expressly incorporated by reference into the present application.

TECHNICAL FIELD

The present disclosure relates to a mobile terminal capable of performing data communication, and a method for controlling the same.

BACKGROUND ART

Terminals may be divided into mobile/portable terminals and stationary terminals according to their mobility. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. Specifically, in recent time, mobile terminals can receive broadcast and multicast signals to allow viewing of video or television programs.

As it becomes multifunctional, a mobile terminal can be allowed to capture still images or moving images, play music or video files, play games, receive broadcast and the like, so as to be implemented as an integrated multimedia player.

A terminal may simultaneously connect two or more networks, such as Wi-Fi, LTE and the like. However, the terminal merely uses one network, such as default network, in actual data communication tasks.

Here, when the used default network is in a bad communication state, the performance of communication tasks are degraded or disabled even though there is another available network.

Also, when desiring to use a specific network for a specific data communication task, there is inconvenience of having to change an entire network setting.

To support and increase functions of the terminal, improvement of structural and/or software configurations of the terminal may be considered.

SUMMARY OF THE INVENTION

Therefore, to obviate those problems and other disadvantages, an aspect of the detailed description is to provide a mobile terminal, capable of setting a network for each preset data communication task and executing the data communication task, and a control method thereof.

To achieve these and other advantages and in accordance with the purpose of the present invention, as embodied and broadly described herein, there is provided a mobile terminal including a wireless communication unit that is configured to execute a data communication task through a default communication module selected from at least one communication module, a display unit that is configured to output at least one object corresponding to the at least one communication module when a preset condition is met in association with a preset data communication task, and a controller that is configured to control, in response to a user input applied to select at least one of the at least one object, the preset data communication task to be executed through a communication module corresponding to the selected at least one object, and the other data communication tasks, except for the preset data communication task, to be executed through the default communication module.

In one embodiment disclosed herein, the preset condition may include a case where the preset data communication task is executed slower than a preset speed.

In one embodiment disclosed herein, the display unit may output at least one icon corresponding to the at least one communication module when the preset condition is met.

In one embodiment disclosed herein, the display unit may output the at least one icon corresponding to the at least one communication mobile according to a preset method on the basis of use or non-use of the at least one communication module and a communication state of the at least one communication module.

In one embodiment disclosed herein, the controller may control, in response to a preset touch input applied to at least one of the at least one icon, the preset data communication task to be executed through a communication module corresponding to the touch input-applied at least one icon.

In one embodiment disclosed herein, the display unit may output a data usage for each communication module corresponding to the at least one icon with the preset touch input applied thereto, in response to the preset data communication task executed through the communication module corresponding to the touch input-applied at least one icon.

In one embodiment disclosed herein, the display unit may output, in response to a preset touch input sensed on at least one of the at least one icon, the touch input-sensed at least one icon according to a preset method.

In one embodiment disclosed herein, when a preset touch input is applied to at least one of the at least one icon, the controller may control the preset data communication task to be executed through a communication module corresponding to the at least one icon with the preset touch input applied thereto. When the applied touch input is released, the controller may control the preset data communication task, currently executed through the communication module corresponding to the touch input-applied at least one icon, to be stopped.

In one embodiment disclosed herein, the display unit may output at least one icon corresponding to the at least one communication module, along with an icon corresponding to a preset application, upon an execution of the preset application.

In one embodiment disclosed herein, the controller may control, in response to a preset touch input applied to at least one of the at least one icon corresponding to the at least one communication module, the preset application to be executed through a communication module corresponding to the touch input-applied at least one icon.

To achieve these and other advantages and in accordance with the purpose of the present invention, as embodied and broadly described herein, there is provided a method for controlling a mobile terminal, the method including (a) executing a data communication task through a default communication module selected from at least one communication module, (b) outputting at least one object corresponding to the at least one communication module, when a preset condition is met in association with a preset data communication task, and (c) executing, in response to a touch input applied to at least one of the at least one object for selection, the preset data communication task through the communication module corresponding to the selected at least one object, wherein data communication tasks except for the preset data communication task are executed through the default communication module.

In one embodiment disclosed herein, the preset condition may include a case where the preset data communication task is executed slower than a preset speed.

In one embodiment disclosed herein, the step (b) may include outputting at least one icon corresponding to the at least one communication module when the preset condition is met.

In one embodiment disclosed herein, the step (b) may include outputting the at least one icon corresponding to the at least one communication module according to a preset method on the basis of use or non-use of the at least one communication module and a communication state of the at least one communication module.

In one embodiment disclosed herein, the step (c) may include controlling, in response to a preset touch input applied to at least one of the at least one icon, the preset data communication task to be executed through the communication module corresponding to the touch input-applied at least one icon.

In one embodiment disclosed herein, the step (c) may include outputting a data usage for each communication module corresponding to the at least one icon with the preset touch input applied thereto, in response to the preset data communication task executed through the communication module corresponding to the touch input-applied at least one icon.

In one embodiment disclosed herein, the step (c) may include outputting, in response to a preset touch input applied to at least one of the at least one icon, the touch input-applied at least one icon according to a preset method.

In one embodiment disclosed herein, the step (c) may include executing the preset data communication task to be executed through a communication module corresponding to at least one of the at least one icon with a preset touch input applied thereto, when the preset touch input start to be applied, and stopping the preset data communication task, which is currently executed through the communication module corresponding to the touch input-applied at least one icon when the preset touch input applied is topped.

In one embodiment disclosed herein, the step (b) may include outputting at least one icon corresponding to the at least one communication module, along with an icon corresponding to a preset application, upon an execution of the preset application.

In one embodiment disclosed herein, the step (c) may include controlling, in response to a preset touch input applied to at least one of the at least one icon corresponding to the at least one communication module, the preset application to be executed through the communication module corresponding to the at least one icon with the preset touch input applied thereto.

Advantageous Effects of Invention

A mobile terminal and a method for controlling the same according to the present invention may provide the following effects.

In accordance with at least one of embodiments of the present invention, a network which is to be used only for a desired data communication task may be designated without changing a default network of a terminal.

Also, in accordance with at least one of embodiments of the present invention, network setting can change in an easy and fast manner, and an overcharge which may result from a bandwidth aggregation function can be avoided.

BRIEF DESCRIPTION OF DRAWINGS

FIG. 1A is a block diagram of a mobile terminal in accordance with the present invention.

FIGS. 1B and 1C are conceptual views illustrating one example of the mobile terminal, viewed from different directions.

FIG. 2 is a flowchart illustrating a method for controlling a mobile terminal in accordance with the present invention.

FIGS. 3A, 3B, 3C, 3D, 4A, 4B and 4C are conceptual views illustrating an embodiment of icons corresponding to available networks.

FIGS. 5A, 5B and 5C are conceptual views illustrating an embodiment of outputting icons corresponding to available networks on a menu of an application.

FIGS. 6A, 6B, 6C and 6D are conceptual views illustrating an embodiment of outputting icons corresponding to available networks when downloading data.

FIGS. 7A and 7B are conceptual views illustrating an embodiment of outputting icons corresponding to available networks when reproducing a video through a network.

FIGS. 8A, 8B and 8C are conceptual views illustrating an embodiment of outputting icons corresponding to available networks when executing a browser application.

FIGS. 9A, 9B and 9C are conceptual views illustrating an embodiment of outputting icons corresponding to available networks when those icons are output along with an icon of an application.

FIGS. 10A and 10B are conceptual views illustrating an embodiment of outputting icons corresponding to available networks when a plurality of networks can be used at the same time.

FIG. 11 is a conceptual view illustrating an embodiment of setting a network.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, moreover, the detailed description will be omitted when a specific description for publicly known technologies to which the invention pertains is judged to obscure the gist of the present disclosure. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It may be understood that implementing all of the illustrated components is not a requirement, and that greater or fewer components may alternatively be implemented.

In more detail, the wireless communication unit 110 among those components may include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for inputting an image signal, a microphone 122 or an audio input unit for inputting an audio signal, and a user input unit 123 (for example, a touch key, a push key, and the like) for allowing a user to input information. Data (for example, audio, video, image, and the like) is obtained by the input unit 120 and may be analyzed and processed according to user commands.

The sensing unit 140 may be implemented using one or more sensors configured to sense internal information of the mobile terminal, the surrounding environment of the mobile terminal, user information, and the like. For example, the sensing unit 140 is shown having a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 may be configured to output various types of information, such as audio, video, tactile output, and the like. The output unit 150 may be shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIG. 1A according to the execution of an application program that have been stored in the memory 170. Also, the controller 180 may operate at least two components included in the mobile terminal in a combining manner to activate the application program.

The power supply unit 190 can be configured to receive external power or provide internal power, under the control of the controller, in order to supply appropriate power required for operating elements and components included in the mobile terminal 100. The power supply unit 190 may include a battery, and the battery may be configured to be embedded in the terminal body, or configured to be detachable from the terminal body.

At least some of those components may be combined for operation to implement an operation, a control or a control method of the mobile terminal according to various embodiments disclosed herein. Also, the operation, the control or the control method of the mobile terminal may be implemented on the mobile terminal by activating at least one application program stored in the memory 170.

Hereinafter, prior to describing various exemplary embodiments implemented by the mobile terminal 100, each of the aforementioned components will be described in more detail with reference to FIG. 1A.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Enhanced Voice-Date Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If necessary, the location information module 115 may perform a function of another module of the wireless communication unit 110, in order to obtain data associated with a location of the mobile terminal in a replacing manner or an additional manner. The location information module 115 is a module used for acquiring a location (or a current location) of the mobile terminal, and may not be limited to a module which directly calculates or acquires the location of the mobile terminal.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 processes an external audio signal into electric audio data. The processed audio data may be utilized in various manners according to a currently-executed function (or a currently-executed application program) in the mobile terminal 100. Meanwhile, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element or a mechanical key (for example, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch (or touch input) applied to the touch screen, such as the display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 as a component of the input unit 120 typically includes at least one of a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, regarding the mobile terminal 100 as at least one assembly (or set), the terminal body may be understood as a conception referring to the assembly (or the set).

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 is shown having a display unit 151, first and second audio output modules 152a and 152b, a proximity sensor 141, an illumination sensor 142, an optical output module 154, first and second cameras 121a and 121b, first and second manipulation units 123a, 123b, a microphone 122, an interface unit 160, and the like.

Hereinafter, description will be given, as illustrated in FIGS. 1B and 1C, of an exemplary embodiment of a mobile terminal, in which the display unit 151, the first audio output module 152a, the proximity sensor 141, the illumination sensor 142, the optical output module 154, the first camera 121a and the first manipulation units 123a are disposed on a front surface of a terminal body, the second manipulation unit 123b, the microphone 122 and the interface unit 160 are disposed on a side surface of the terminal body, and the second audio output module 152b and the second camera 121b are disposed on a rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a receiver to transfer voice audio to a user's ear, and the second audio output module 152*b* may be implemented in the form of a loud speaker to output alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

The drawings illustrate an example that the first manipulation unit 123*a* is a touch key, but the present disclosure may not be limited to this. For example, the first manipulation unit 123*a* may be configured as a push key (or a mechanical key) or in combination of the touch key and the push key.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the terminal body, a new type of user interface using this can be implemented. Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

A flash 124 is shown adjacent to the second camera 121*b*. When an image of a subject is captured with the camera 121*b*, the flash 124 may illuminate the subject.

The second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or resonance (electromagnetic resonance).

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, a communication system which is operable with the mobile terminal 100 according to the present disclosure will be described.

First, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including Orthogonal Frequency Division Multiplexing (OFDM) as well as the CDMA wireless communication system.

A CDMA wireless communication system includes a plurality of mobile terminals 100, a plurality of base stations (BSs), base station controllers (BSCs), and a mobile switching center (MSC). The MSC is configured to interface with a conventional Public Switch Telephone Network (PSTN). The MSC is also configured to interface with the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA system.

Each base station may include one or more sectors, each sector having an omnidirectional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 (FIG. 1*a*) is typically configured inside the mobile terminal 100 to receive broadcast signals transmitted by the BT.

Several Global Positioning System (GPS) satellites 300 facilitate locating the position of at least one of plural mobile terminals 100. Two satellites may be used, but it is understood that useful position information may be obtained with greater or fewer satellites than two satellites. The GPS module 115 is typically configured to cooperate with the satellites to obtain desired position information. It is to be appreciated that other types of position detection technology may alternatively be implemented. If desired, at least one of the GPS satellites may alternatively or additionally be configured to provide satellite DMB transmissions.

As previously described with regard to FIG. 1A, the mobile terminal may be configured to include short-range communication techniques such as Bluetooth™ Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

FIG. 2 is a flowchart illustrating a method for controlling a mobile terminal in accordance with the present invention.

As illustrated in FIG. 2, a default communication module selected from at least one communication module executes a data communication task (S210).

The at least one communication module may be defined as a network (available network) which is connected by the wireless communication unit 110 to be used for data transmission and reception. In detail, the at least one communication module is a connectable network according to a current position of the terminal 100 and may include mobile communication networks, such as Wi-Fi, LTE, LTE-A and the like.

The default communication module may be a default communication module or a user-selected communication module among the at least one communication module. Also, the data communication task may be defined as a task of transmitting and receiving data through the communication module.

Next, when a preset condition is met in association with a preset data communication task, at least one object corresponding to the at least one communication module is output (S220).

The preset data communication task may be defined as a preset one among tasks (the data communication tasks) of transmitting and receiving data through a network. For example, the preset data communication task may include downloading data, executing an application or receiving and reproducing a video through a network, executing a web browser, or the like.

Here, a unit of the preset data communication task may be variously set without a limit. For example, the unit may be set to a case of executing a web browser or a case of executing a specific webpage during execution of the web browser.

The preset condition may include a case where the preset data communication task is executed. For example, the preset condition may correspond to downloading data.

As another embodiment, the preset condition may include a case where the preset data communication task is executed slower than a preset speed. In detail, when data downloading is executed slower than a predetermined speed, it may be considered as corresponding to the preset condition.

As another embodiment, the preset condition may include a case where a user input for outputting at least one object corresponding to the at least one communication module is sensed. In detail, when a preset touch input is applied by a user while downloading data, it may be considered as corresponding to the preset condition.

The object corresponding to the at least one communication module may include at least one icon to which a touch input is applied in correspondence with the at least one communication module (available network). Also, when there are a plurality of available networks, a plurality of icons corresponding to the networks, respectively, may be output.

As one embodiment, when data downloading is executed slower than a predetermined speed, a first icon and a second icon respectively corresponding to Wi-Fi and LTE which are available networks may be output on one region of the screen 151. For example, the first icon and the second icon may be output on separate pop-up windows, respectively.

As another embodiment, the at least one icon corresponding to the at least one communication module may be output according to a preset method on the basis of use or non-use of the networks and communication states of the networks. For example, when a currently used Wi-Fi is in a good communication state, the first icon corresponding to the Wi-Fi may be displayed in a green color. If the currently used Wi-Fi is in a bad communication state, the first icon may be displayed in a red color. Also, the second icon corresponding to the non-used LTE may be output in a gray color.

As another embodiment, the at least one icon corresponding to the at least one communication module may be output along with an icon corresponding to a preset application when the preset application is executed. For example, the first icon corresponding to the Wi-Fi and the second icon corresponding to the LTE may be output on one region of a messenger application icon which is currently output on a home screen.

As another embodiment, the at least one object corresponding to the at least one communication module may be output according to a type of a network. In detail, when a plurality of Wi-Fi networks are searched for as the available networks, one icon corresponding to Wi-Fi in the best communication state may be output.

As another embodiment, the at least one object corresponding to the at least one communication module may be output to correspond to every network. For example, when a plurality of Wi-Fi networks are searched for as the available networks, a plurality of icons corresponding to the Wi-Fi networks, respectively, may be output.

Afterwards, in response to a user input sense to select at least one of the at least one object corresponding to the at least one communication module, the preset data communication task is executed through a communication module corresponding to the selected at least one object, and the other data communication tasks except for the preset data communication task are executed through the default communication module (S230).

That is, only the preset data communication task is executed through the selected communication module, and the other communication tasks may be continuously executed through the default communication module.

As one embodiment, in response to a preset touch input applied to at least one of the at least one icon corresponding to the at least one communication module, the preset data communication task may be executed through a communication module corresponding to the at least one icon to which the preset touch input has been applied.

In detail, when data downloading is executed slower than a predetermined speed, the first icon corresponding to Wi-Fi and the second icon corresponding to LTE may be output on one region of the screen 151. Afterwards, when a touch input is applied to the second icon, the data downloading is executed through the LTE.

As another embodiment, as the preset data communication task is executed through the communication module corresponding to the at least one icon to which the preset touch input has been applied, a data usage for each communication module corresponding to the at least one icon may be output. This may prevent overcharging for the data usage.

As another embodiment, in response to a preset touch input applied to at least one of the at least one icon corresponding to the at least one communication module, the at least one icon to which the preset touch input has been applied may be output in a preset manner. For example, the selected icon may be output in a specific shape, size, color and the like.

As another embodiment, when a preset touch input starts to be applied to at least one of the at least one icon corresponding to the at least one communication module, the preset data communication task may be executed through a communication module corresponding to the icon to which the preset touch input is currently applied. When the preset touch input is released, the preset data communication task which is being executed through the communication module corresponding to the touch input-applied icon may be stopped.

That is, only while a touch input is applied to an icon, a preset data communication task is executed through a network corresponding to the icon. This may result in prevention of an overcharge.

As another embodiment, the at least one icon corresponding to the at least one communication module may be output along with an icon corresponding to a preset application when the preset application is executed. Afterwards, when a preset touch input is sensed on at least one of the at least one icon corresponding to the at least one communication module, the preset application may be executed through a communication module corresponding to the at least one icon to which the preset touch input has been applied.

In detail, the first icon corresponding to the Wi-Fi and the second icon corresponding to the LTE may be output on one region of a messenger application icon which is currently output on a home screen. Afterwards, when a touch input is applied to the second icon, the messenger application is executed through the LTE.

As aforementioned, when a preset condition is met in association with a specific data communication task, an icon corresponding to a network (the at least one communication module) which is currently available in the mobile terminal 100 may be output.

FIGS. 3A, 3B, 3C, 3D, 4A, 4B and 4C are conceptual views illustrating an embodiment of icons corresponding to available networks.

In one embodiment, when a preset condition is met, for example, when large-scale data is downloaded or the downloading of the large-scale data is executed slower than a preset speed, user interfaces as illustrated in FIGS. 3A, 3B, 3C, 3D, 4A, 4B and 4C may be output.

In detail, a panel 300 which includes icons corresponding to available networks may be output on one region of the screen 151. Here, the icons may be output as many as the number of accessible network types. Also, prior to selection of a network, a data communication task may be executed through a default network, and the icons may be output in different shapes, colors or sizes, based on use or non-use of the networks or communication states of the networks.

Meanwhile, as aforementioned, the corresponding data communication task is executed through a network corresponding to a user-selected icon from the icons corresponding to the available networks. Also, the output shape, color, size and the like of the selected icon may be different from those of the other icons.

When the preset data communication task is terminated, a data communication task which is different from the preset data communication task is executed through a default network. In one example, downloading of a preset large-scale data may be executed through LTE selected by a user. Afterwards, when the downloading of the large-scale data is completed, another data communication task may be executed through Wi-Fi as the default network. That is, the selected network may be individually used only for the preset data communication task.

Referring to FIG. 3A, when a preset condition is met, a panel 300 which includes icons 310 and 320 corresponding to available networks may be output. In detail, when Wi-Fi and LTE are searched for as the available networks, the W icon 310 corresponding to the Wi-Fi and the L icon 320 corresponding to the LTE may be output. Here, the W icon 310 and the L icon 320 may be output different from each other in color according to use or non-use of the corresponding networks and communication states of the networks.

In an embodiment, when the Wi-Fi is set as a default network or a user applies a touch input to the W icon 310, the Wi-Fi may be used for a specific data communication task. Accordingly, the W icon 310 may be output in a green color when the currently-used Wi-Fi is in a good communication state, while being output in a red color when the currently-used Wi-Fi is in a bad communication state. Also, the L icon 320 corresponding to the LTE which is not currently used may be output in a gray color.

As another embodiment, when the LTE is set as the default network or the user applies a touch input to the L icon 320, the LTE may be used for a specific data communication task. Accordingly, the L icon 320 may be output in a green color when the currently-used LTE is in a good communication state, while being output in a red color when the currently-used LTE is in a bad communication state. Also, the W icon 310 corresponding to the Wi-Fi which is not currently used may be output in a gray color.

As another embodiment, when the user applies a multi-touch input to the W icon 310 and the L icon 320, the Wi-Fi and LTE may all be used for a specific data communication task. Accordingly, each icon 310 and 320 may be output in a green color in good communication states, while being output in a red color in bad communication states.

As another embodiment, when it is impossible to use both of the Wi-Fi and the LTE for a preset data communication task, one icon may be activated while the other icon may automatically be deactivated. For example, the L icon 320 to which a touch input has been applied by the user may be output in a green color. On the other hand, the W icon 310 may be deactivated so as to be output in a gray color.

Referring to FIG. 3B, when a preset condition is met, a panel 300-1 which includes icons 310-1, 320-1 and 330 corresponding to available networks may be output. In detail, when Wi-Fi, LTE and LTE-A are searched for as the available networks, the W icon 310-1 corresponding to the Wi-Fi, the L icon 310-1 corresponding to the LTE, and the LA icon 330 corresponding to the LTE-A may be output. Here, the output icons 310-1, 320-1 and 330 may have different colors from one another according to use or non-use of the corresponding networks and communication states of the networks.

As an embodiment, when a user applies a touch input to the LA icon 330, the LTE-A may be used for a specific data communication task. Accordingly, the LA icon 330 may be output in a green color when the currently-used LTE-A is in a good communication state, while being output in a red color when the currently-used LTE-A is in a bad communication state. Also, the icons 310-1 and 320-1 corresponding to the Wi-Fi and the LTE which are not currently used may be output in a gray color.

Referring to FIG. 3C, when a preset condition is met, a panel 300-2 which includes icons 310-2 and 320-2 corresponding to available networks may be output in a manner that the icons 310-2 and 320-2 are horizontally aligned. In detail, when Wi-Fi and LTE are searched for as the available networks, the W icon 310-2 corresponding to the Wi-Fi and the L icon 320-2 corresponding to the LTE may be output by being aligned in the horizontal direction. Here, the W icon 310-2 and the L icon 320-2 may be differently output in shape or size, according to use or non-use of the corresponding networks and communication states of the networks.

In an embodiment, when the LTE is set as a default network or a user applies a touch input to the L icon 320-2, the LTE may be used for a specific data communication task. Accordingly, the L icon 320-2 corresponding to the currently-used LTE may be output greater than the W icon 310-2.

Also, the L icon 320-2 may be output in a green color when the currently-used LTE is in a good communication state, while being output in a red color when the currently-used LTE is not in a good communication state. On the other hand, the W icon 310-2 corresponding to the Wi-Fi which is not currently used may be output in a gray color.

Referring to FIG. 3D, when a preset condition is met, a panel 300-3 which includes icons 310-3 and 320-3 corresponding to available networks may be output. In detail, when Wi-Fi and LTE are searched for as the available networks, the W icon 310-3 corresponding to the Wi-Fi and the L icon 320-3 corresponding to the LTE may be output. Here, the W icon 310-3 and the L icon 320-3 may be output different from each other in shape or size according to use or non-use of the networks and communication states of the networks.

For example, when the LTE is set as a default network or a user applies a touch input to the L icon 320-3, the LTE may be used for a specific data communication task. Accordingly, the L icon 320-3 corresponding to the currently-used LTE may be output in a different shape from that of the W icon 310-3.

Also, the L icon 320-3 may be output in a green color when the currently-used LTE is in a good communication state, while being output in a red color when the currently-used LTE is not in a good communication state. On the other hand, the W icon 310-3 corresponding to the Wi-Fi which is not currently used may be output in a gray color.

Meanwhile, as another embodiment, as a preset data communication task is executed through a network corresponding to at least one icon to which a preset touch input has been applied, a data usage for each network corresponding to the at least one icon may be output.

Also, prior to a user selection for a network, even when a preset data communication task is executed through a default network, a data usage may be output on an icon corresponding to the default network.

Referring to FIG. 4A, when a preset condition is met, a panel 400 which includes icons 410 and 420 corresponding to available networks may be output. In detail, when Wi-Fi and LTE are searched for as the available networks, the W icon 410 corresponding to the Wi-Fi and the L icon 420 corresponding to the LTE may be output.

Afterwards, when a user applies a touch input to the W icon 410, a preset data communication task may be executed through the Wi-Fi. Also, the W icon 410 corresponding to the currently-used Wi-Fi may be output from different from the L icon 420 in view of shape, size, color or the like.

Meanwhile, in response to the execution of the preset data communication network through the Wi-Fi, a data usage 412 for the Wi-Fi may be output within the W icon 410. For example, 12 Mbytes of data are used by the preset data communication task, 12M 412 may be output within the W icon 410. That is, a data usage which is used only by the corresponding data communication task may be displayed.

Referring to FIG. 4B, when a preset condition is met, a panel 400-1 which includes icons 410-1 and 420-1 corresponding to available networks may be output. In detail, when Wi-Fi and LTE are searched for as the available networks, the W icon 410-1 corresponding to the Wi-Fi and the L icon 420-1 corresponding to the LTE may be output.

Afterwards, when a user applies a touch input to the L icon 420-1, a preset data communication task may be executed through the LTE. Also, the L icon 420-1 corresponding to the currently-used LTE may be output different from the W icon 410-1 in view of color, shape, size or the like.

In response to the execution of the preset data communication network through the LTE, a data usage 422 for the LTE may be output within the L icon 420-1. For example, 89 Kbytes of data are used by the preset data communication task, 89K 422 may be output within the L icon 420-1. That is, a data usage which is used only by the corresponding data communication task may be displayed.

Referring to FIG. 4C, when a preset condition is met, a panel 400-2 which includes icons 410-2 and 420-2 corresponding to available networks may be output. In detail, when Wi-Fi and LTE are searched for as the available networks, the W icon 410-2 corresponding to the Wi-Fi and the L icon 420-2 corresponding to the LTE may be output.

Afterwards, when a user applies a multi-touch input to the W icon 410-2 and the L icon 420-2, a preset data communication task may be executed through the Wi-Fi and the LTE. Also, the currently-used W icon 410-2 and L icon 420-2 may be output in preset colors, shapes, sizes and the like on the basis of communication states thereof, respectively.

In response to the execution of the preset data communication task through the Wi-Fi and the LTE, a data usage 414 for the Wi-Fi and a data usage 424 for the LTE may be output within the icons 410-2 and 420-2, respectively.

For example, the preset data communication task may be executed by 1 Gbytes through the Wi-Fi and 2 Gbytes through the LTE. Accordingly, 1G 414 may be output within the W icon 410-2, and 2G 424 may be output within the L icon 420-2. That is, a data usage which is used only by the corresponding data communication task may be displayed.

Those icons illustrated in FIGS. 3A, 3B, 3C, 3D, 4A, 4B and 4C may be output on various positions according to preset data communication tasks.

FIGS. 5A, 5B and 5C are conceptual views illustrating an embodiment of outputting icons corresponding to available networks on a menu of an application.

As illustrated in FIG. 5A, a user may apply a touch input to a menu icon 510 of an application while the application is executed. In detail, the menu icon 510 of the application may be defined as an object by which a list of executable functions are output in association with the application when it is selected.

Also, the menu icon 510 of the application may be output on an arbitrary position. For example, the menu icon 510 of the application may be output adjacent to an address window or on one region of a lower end of the screen 151.

Referring to FIG. 5B, when a touch input is applied to the menu icon 510 of the application, a list 520 of executable functions associated with the application may be output. For example, the list 520 of the executable functions associated with the application may include memo, search, bookmark, capture and the like.

Here, the list 520 of the executable functions associated with the application may include icons 530 and 540 corresponding to available networks when the application is executed. For example, the icons 530 and 540 may be included, irrespective of a communication state of a currently-used default network, or included only when the default network is in a bad communication state.

In detail, the W icon 530 corresponding to Wi-Fi and the L icon 540 corresponding to LTE, which are available networks when the application is activated, may be output. Here, the W icon 530 and the L icon 540 may be output different from each other in color, shape or size, according to use or non-use of the networks and communication states of the networks.

As an embodiment, when the Wi-Fi has been set to the default network, the application may be executed using the Wi-Fi which is in a good communication state. Accordingly, the W icon 530 may be output in a green color and the L icon 540 may be output in a gray color. Also, a data usage by the execution of the application may be updated in real time and displayed within the W icon 530.

Afterwards, when a user applies a touch input to the L icon 540, the application may be executed using the LTE. In detail, only a task belonging to a range of a preset data communication task may be executable through the LTE.

In an embodiment, when the range of the preset data communication task is the execution of the application, the LTE can be used until before the application is closed.

In another embodiment, when the range of the preset data communication task is one page of the application, the LTE may be used if the page is currently output, while the Wi-Fi as the default network may be used if another page is currently output even while the application is executed.

Referring to FIG. 5C, while the application is executed using the LTE in response to a touch input applied to the L icon 540, the user can apply a touch input to the menu icon 510 of the application.

Accordingly, the list 520 of the executable functions associated with the application may be output again and the list 520 may include the W icon 530 and the L icon 540. Here, the W icon 530 and the L icon 540 may be output different from each other in color, shape or size, according to use or non-use of the networks and communication states of the networks.

In detail, when the application is being executed using the LTE which is in the good communication state, the W icon 530 may be output in a gray color and the L icon 540 in a green color. Also, a data usage by the execution of the application may be updated in real time and displayed within the L icon 540.

FIGS. 6A, 6B, 6C and 6D are conceptual views illustrating an embodiment of outputting icons corresponding to available networks when downloading data.

As illustrated in FIG. 6A, data download may be executed using Wi-Fi as a default network. Here, a panel 600 which includes a progress 620 of the data download and icons 630 and 640 corresponding to available networks upon downloading the data may be output on a notification region 610 of an unfolded status bar.

In an embodiment, the panel 600 may be displayed adjacent to a progressing rate of the data downloading when the download is executed slower than a preset speed due to a bad wireless communication environment of the Wi-Fi as the default network.

In detail, the panel 600 may include the W icon 630 corresponding to Wi-Fi, and the L icon 640 corresponding to LTE. Also, the W icon 630 and the L icon 640 may be output different from each other in color, shape or size according to use or non-use of the networks and communication states of the networks.

For example, when the data download is executed using the Wi-Fi which is in a bad wireless environment, the W icon 630 corresponding to the Wi-Fi may be output in a red color and the L icon 640 corresponding to the LTE which is not currently used in a gray color.

A user may then apply a touch input to the L icon 640 to change a network from the Wi-Fi as the default network into the LTE.

Referring to FIG. 6B, when the user applies the touch input to the L icon 640, the data download using the Wi-Fi is stopped. Afterwards, the stopped download may be restarted by connecting the terminal 100 to the LTE.

Here, the W icon 630 and the L icon 640 may be output different from each other in color, shape or size according to use or non-use of the networks and communication states of the networks. For example, when the data download is executed using the LTE which is in a good wireless environment, the L icon 640 may be output in a green color and the W icon 630 corresponding to the Wi-Fi, which has been stopped in use, may be output in a gray color.

Also, when the data download is completed, the connection between the terminal 100 and the LTE may be released and the connection between the terminal 100 and the Wi-Fi as the default network may be established.

In another embodiment, only while the user continuously touches the L icon 640, the data download through the LTE may be in progress. In detail, when the user takes a finger onto the L icon 640 and starts to apply a long touch input to the L icon 640, the data download using the Wi-Fi may be stopped and then the LTE may be connected to keep performing the stopped data download.

Afterwards, when the user takes the finger away from the L icon 640, the connection between the terminal 100 and the LTE is released and the connection between the terminal 100 and the Wi-Fi as the default network is established again. Accordingly, the user can optionally control an additional usage time of the network within a data communication task, thereby preventing overcharge.

Referring to FIG. 6C, when plural data downloading tasks are executed simultaneously or sequentially, panels 670 and 680 to select networks for the respective data downloading tasks may be output.

In detail, a progress 650 of downloading a first data and a progress 660 of downloading a second data may be output on the notification region 610 of the unfolded status bar, and the panels 670 and 680 for selecting networks may be output adjacent to the respective data download progresses 650 and 660.

In an embodiment, a W icon 672 corresponding to Wi-Fi and an L panel 674 corresponding to LTE, which are available when downloading the first data, may be included in the panel 670. Similarly, a W icon 682 corresponding to the Wi-Fi and an L icon 684 corresponding to the LTE, which are available when downloading the second data, may be included in the panel 680.

In an embodiment, the download of the first and second data may be executed through the Wi-Fi as a default network, and a user may apply a touch input to the L icon 684 in association with the downloading of the second data. Accordingly, the download of the first data may be executed through the Wi-Fi and the download of the second data may be executed through the LTE in a simultaneous or sequential manner. That is, a different network may be set for each data communication task.

Referring to FIG. 6D, an installation file of an application may be downloaded using Wi-Fi as the default network. Accordingly, a panel 690 which includes icons 692 and 694 corresponding to available networks upon downloading the installation file may be output on a screen 696 on which the installation file of the application is currently downloaded.

In an embodiment, the panel 690 may be displayed adjacent to a progressing rate of the data download or on a separate pop-up window when the data download is executed slower than a preset speed due to a bad wireless environment of the Wi-Fi as the default network.

Then, when the user touches the L icon 694 corresponding to the LTE, the download of the installation file which is currently executed through the Wi-Fi may be stopped and then the stopped download of the installation file may be restarted after connecting the terminal 100 to the LTE.

FIGS. 7A and 7B are conceptual views illustrating an embodiment of outputting icons corresponding to available networks when reproducing a video through a network.

As illustrated in FIG. 7A, when a user reproduces a video on an application, data of the video may be received using Wi-Fi as a default network. Here, when the data is received slower than a preset speed due to a bad wireless environment of the Wi-Fi, a screen 700 which indicates the ongoing data reception may be continuously output.

Also, a panel 710 which includes a W icon 720 corresponding to Wi-Fi and an L icon 730 corresponding to LTE, which are available upon the reception of the video data may be output on one region of a video menu.

Here, the W icon 720 and the L icon 730 may be output different from each other in color, shape or size according to use or non-use of the networks and communication states of the networks. For example, when the Wi-Fi which is not in a good wireless state is currently used, the W icon 720 may be output in a red color. Also, the L icon 730 corresponding to the LTE which is not currently used may be output in a gray color.

Afterwards, the user may apply a touch input to the L icon 730 to select the LTE as the network for receiving the video data.

Referring to FIG. 7B, the reception of the video data which is ongoing through the Wi-Fi may be stopped and then restarted after the terminal 100 is connected to the LTE. Also, when the reception of the video data is completed, the connection with the LTE may be released and the connection with the Wi-Fi as the default network may be reestablished.

In another embodiment, a network may be selectable when the video is buffered and when the video is reproduced, respectively. In detail, the panel 700 may be output while the video is buffered, and accordingly, the user may select a desired network to connect from the Wi-Fi and the LTE.

Then, when the video starts to be reproduced, the connection with the network which has been selected while buffering the video may be released, and a network that the user desires to connect may be reselected from the Wi-Fi and the LTE. Or, the connection with the Wi-Fi as the default network may be reestablished so as to reproduce the video through the Wi-Fi.

As another embodiment, only while the user continuously touches the L icon 730, the reception of the video data through the LTE may be continued. In detail, when the user takes a finger onto the L icon 730 and starts to apply a long touch input to the L icon 730, the reception of the video data through the Wi-Fi may be stopped. The stopped reception of the video data may be restarted after the terminal is connected to the LTE.

Afterwards, when the user takes the finger away from the L icon 730, the connection between the terminal 100 and the LTE may be released and the connection between the terminal 100 and the Wi-Fi as the default network may be reestablished. Accordingly, the user can optionally control an additional usage time of the network within a data communication task, thereby preventing overcharge.

FIGS. 8A, 8B and 8C are conceptual views illustrating an embodiment of outputting icons corresponding to available networks when executing a browser application.

As illustrated in FIG. 8A, a user may call a webpage through a browser application. Accordingly, the browser application may start to download the webpage through Wi-Fi as a default network. Here, when the reception of the webpage is executed slower than a preset speed due to a bad wireless environment of the Wi-Fi, icons 810 and 820 for selecting available networks may be output.

In detail, the icons 810 and 820 for selecting the available networks may be displayed on an address window 800 of the browser application. Here, the icons 810 and 820 may be output different from each other in color, shape or size according to use or non-use of the networks and communication states of the networks.

In an embodiment, when the reception of the webpage data is executed slower than a preset speed due to a bad wireless environment of the Wi-Fi, the W icon 810 corresponding to the Wi-Fi may be output in a red color. Also, the L icon 820 corresponding to the LTE which is not currently used may be output in a gray color.

That is, the user can recognize the bad wireless environment of the currently-used Wi-Fi on the basis of the colors, shapes, sizes of the icons 810 and 820. Or, the user can recognize the bad wireless environment from a slow output of the corresponding webpage. Accordingly, the user may apply a touch input to the L icon 810 to change the currently-used network.

As a result, the download of the webpage data which is currently executed through the Wi-Fi is stopped. The stopped download may be restarted after the terminal 100 is connected to the LTE. Afterwards, when the download of the webpage data is completed, the connection with the LTE may be released and the connection with the Wi-Fi as the default network may be reestablished.

As illustrated in FIGS. 5A, 5B and 5C, a selected network may be continuously used while executing an application or be used only upon downloading a specific page of the application.

In an embodiment, referring to FIG. 8A, when the network select icons 810 and 820 are output on the address window 800, the selected network may be used only when downloading a webpage of a corresponding URL.

As another embodiment, as illustrated in FIGS. 5A, 5B and 5C, when the network select icons are output on a menu of a browser application, the selected network may be used until before the browser application is closed.

As another embodiment, referring to FIG. 8B, the user may turn a webpage 830 over by applying a scroll input 840. Here, when the wireless environment of the Wi-Fi as the default network is not good, a pop-up window 850 for selecting a network may be output.

In an embodiment, the pop-up window 850 may be output on a region on which the webpage 830 is slowly output or loading of the webpage 830 is disconnected. Also, the popup window 850 may include a W icon 852 corresponding to Wi-Fi and an L icon 854 corresponding to LTE.

Accordingly, when a user applies a touch input to the L icon 854, the connection with the Wi-Fi is released and the webpage 830 is loaded through the LTE. For example, when the webpage 830 is completely loaded, the connection with the LTE may be released or continued while the browser application is executed.

As another embodiment, referring to FIG. 8C, when the L icon 820 is selected as illustrated in FIG. 8A during an overseas roaming service, a popup window 860 warning the selection may be output. Accordingly, an overcharge due to data usage may be prevented. Or, a network select function may be set to an OFF state during the overseas roaming service.

Meanwhile, as aforementioned, icons corresponding to networks available upon an execution of a preset application may be output along with an icon corresponding to the preset application.

Also, in response to sensing of a preset touch input applied to at least one icon corresponding to the available network, the controller 180 may control the preset application to be executed through a network corresponding to the at least one icon with the preset touch input applied thereto.

FIGS. 9A, 9B and 9C are conceptual views illustrating an embodiment of outputting icons corresponding to available networks when those icons are output along with an icon of an application.

As illustrated in FIG. 9A, a user may apply a long touch input to an icon 910 of an application which the user desires to execute by selecting a network, among icons of applications output on a home screen.

As illustrated in FIG. 9B, icons 920 and 930 corresponding to available networks upon executing the application may be displayed on the icon 910 of the corresponding application. In detail, the W icon 930 corresponding to Wi-Fi and the L icon 920 corresponding to LTE, which are available upon the execution of the application, may be output on one regions of upper and lower ends of the application icon 910, respectively.

Afterwards, when desiring to execute the application through the LTE, the user may select the LTE through a touch input applied to the L icon 920.

Referring to FIG. 9C, the application may then be executed through the LTE. Here, an object 940 indicating the current use of the LTE network may be output on a status bar of the terminal 100. Meanwhile, when the use of the LTE is impossible, the application may be executed through the Wi-Fi as the default network.

FIGS. 10A and 10B are conceptual views illustrating an embodiment of outputting icons corresponding to available networks when a plurality of networks can be used at the same time.

As illustrated in FIG. 10A, when the terminal 100 is provided with a bandwidth aggregation function, data download may be enabled using Wi-Fi and LTE at the same time.

In this instance, a panel 1030 which includes a progress 1020 of the data download and icons 1040 and 1050 corresponding available Wi-Fi and LTE, respectively, may be output on a notification region 1010 of an unfolded status bar. Or, the panel 1030 may be displayed on a popup window notifying that the bandwidth aggregation function is currently executed.

In an embodiment, the data download may be started through the Wi-Fi as a default network. When the LTE is also available to use while the bandwidth aggregation function is activated, the data download may be executed using both of the Wi-Fi and the LTE at the same time.

Here, the icons 1040 and 1050 corresponding to the respective networks may be output different from each other in color, shape or size according to use or non-use of the networks and communication states of the networks. A data usage for each network may be updated in real time for display.

As an embodiment, when the data download is executed simultaneously using both of the Wi-Fi and the LTE each in a good communication state, the W icon 1040 and the L icon 1050 may be output in a green color. Also, the data usage using the Wi-Fi may be displayed within the W icon 1040 and the data usage using the LTE within the L icon 1050 after being updated in real time.

Here, when desiring to execute the data download only through the Wi-Fi, the user may apply a touch input to the L icon 1050.

Referring to FIG. 10B, when the touch input is applied to the L icon 1050, the connection with the LTE may be released. Hence, the data download is executed only through the Wi-Fi. Here, the setting of the network such as the default network and the setting of the bandwidth aggregation function may be maintained as they are.

As another embodiment, limits of a data usage of Wi-Fi and a data usage of LTE may be preset, respectively. That is, while the bandwidth aggregation function is activated, the data download through each network may be performed within the preset limit. If the data usage using the LTE reaches the preset limit, the data download may be done only using the Wi-Fi.

Meanwhile, when it is determined that a currently-used network is not in a good communication state, another available network may automatically be activated for use. In this instance, excessive charges may be expected. Hence, a default setting of the corresponding function may be turned off and an item may be added to a network setting list so as for the user to change the setting.

FIG. 11 is a conceptual view illustrating an embodiment of setting a network.

As illustrated in FIG. 11, when an icon for setting a network is touched, a popup window 1100 for setting the network may be output. A menu 1110 of the aforementioned automatic network select function may be output on the popup window 1100, and accordingly the user can select the function by applying a touch input to a checkbox 1120 of the menu 1110.

In detail, when the user applies a touch input to the checkbox 1120, the checkbox 1120 may be ticked off. When it is determined that the currently-used network is not in a good communication state, another available network may automatically be activated for use.

As an embodiment, a network showing the best communication state may be connected among other available networks. Here, to avoid overcharge, when the network change is automatically performed, a popup window notifying the automatic change may be output before the change of the network.

Meanwhile, a menu 1130 for setting a time to use a selected network may be output on the popup window 1100 for setting the network. For example, when the user applies touch inputs to a checkbox 1140 of a time setting menu 1130 and a checkbox 1150 for a specific time, the checkboxes 1140 and 1150 may be ticked off. Accordingly, when an LTE network is selected while executing a preset data communication task, the LTE may be connected and used only for the specific time.

A mobile terminal and a method for controlling the same according to the present invention may provide the following effects.

In accordance with at least one of embodiments of the present invention, a network which is to be used only for a desired data communication task may be designated without changing a default network of a terminal.

Also, in accordance with at least one of embodiments of the present invention, network setting can change in an easy and fast manner, and an overcharge which may result from a bandwidth aggregation function can be avoided.

The present disclosure can be implemented as computer-readable codes in a program-recorded medium. A mobile terminal which can be read by the computer and a method for controlling the same according to the present invention may provide the following effects.

In accordance with at least one of embodiments of the present invention, a network which is to be used only for a desired data communication task may be designated without changing a default network of a terminal.

Also, in accordance with at least one of embodiments of the present invention, network setting can change in an easy and fast manner, and overcharging which may result from a bandwidth aggregation function can be avoided. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A mobile terminal comprising:
 a wireless communication unit that is configured to execute a data communication task through a default communication module selected from at least one communication module;
 a display unit that is configured to display at least one object corresponding to the at least one communication module when a preset condition is met in association with a preset data communication task; and
 a controller that is configured to control, in response to a user input applied to select at least one of the at least one object, the preset data communication task to be executed through a communication module corresponding to the selected at least one object, and other data communication tasks, except for the preset data communication task, to be executed through the default communication module,
 wherein the display unit displays at least one icon corresponding to the at least one communication module when the preset condition is met.

2. The mobile terminal of claim 1, wherein the preset condition comprises when the preset data communication task is executed slower than a preset speed.

3. The mobile terminal of claim 1, wherein the display unit displays the at least one icon corresponding to the at least one communication mobile according to a preset method on the basis of use or non-use of the at least one communication module and a communication state of the at least one communication module.

4. The mobile terminal of claim 1, wherein the controller controls, in response to a preset touch input applied to at least one of the at least one icon, the preset data communication task to be executed through a communication module corresponding to the touch input-applied at least one icon.

5. The mobile terminal of claim 4, wherein the display unit displays a data usage for each communication module corresponding to the at least one icon with the preset touch input applied thereto, in response to the preset data communication task executed through the communication module corresponding to the touch input-applied at least one icon.

6. The mobile terminal of claim 1, wherein the display unit displays, in response to a preset touch input sensed on at least one of the at least one icon, the touch input-sensed at least one icon according to a preset method.

7. The mobile terminal of claim 1, wherein the controller, when a preset touch input is applied to at least one of the at least one icon, controls the preset data communication task to be executed through a communication module corresponding to the at least one icon with the preset touch input applied thereto, and wherein the controller controls the preset data communication task, currently executed through the communication module corresponding to the touch input-applied at least one icon, to be stopped when the applied touch input is released.

8. The mobile terminal of claim 1, wherein the display unit displays the at least one icon corresponding to the at least one communication module, along with an icon corresponding to a preset application, upon an execution of the preset application.

9. The mobile terminal of claim 8, wherein the controller controls, in response to a preset touch input applied to at least one of the at least one icon corresponding to the at least one communication module, the preset application to be executed through a communication module corresponding to the touch input-applied at least one icon.

10. A method for controlling a mobile terminal, the method comprising:
   (a) executing a data communication task through a default communication module selected from at least one communication module;
   (b) displaying at least one object corresponding to the at least one communication module on a display unit, when a preset condition is met in association with a preset data communication task; and
   (c) executing, via a controller, in response to a touch input applied to at least one of the at least one object for selection, the preset data communication task through the communication module corresponding to the selected at least one object,
   wherein data communication tasks except for the preset data communication task are executed through the default communication module,
   wherein the step (b) comprises:
   displaying at least one icon corresponding to the at least one communication module when the preset condition is met.

11. The method of claim 10, wherein the preset condition comprises when the preset data communication task is executed slower than a preset speed.

12. The method of claim 10, wherein the step (b) comprises:
   displaying on the display unit the at least one icon corresponding to the at least one communication module according to a preset method on the basis of use or non-use of the at least one communication module and a communication state of the at least one communication module.

13. The method of claim 10, wherein the step (c) comprises:
   controlling, in response to a preset touch input applied to at least one of the at least one icon, the preset data communication task to be executed through the communication module corresponding to the touch input-applied at least one icon.

14. The method of claim 13, wherein the step (c) comprises:
   displaying a data usage for each communication module corresponding to the at least one icon with the preset touch input applied thereto on the display unit, in response to the preset data communication task executed through the communication module corresponding to the touch input-applied at least one icon.

15. The method of claim 10, wherein the step (c) comprises:
   displaying on the display unit in response to a preset touch input applied to at least one of the at least one icon, the touch input-applied at least one icon according to a preset method.

16. The method of claim 10, wherein the step (c) comprises:
   executing the preset data communication task to be executed through a communication module corresponding to at least one of the at least one icon with a preset touch input applied thereto, when the preset touch input start to be applied, and stopping the preset data communication task, which is currently executed through the communication module corresponding to the touch input-applied at least one icon when the preset touch input applied is topped.

17. The method of claim 10, wherein the step (b) comprises:
   displaying on the display unit at least one icon corresponding to the at least one communication module, along with an icon corresponding to a preset application, upon an execution of the preset application.

18. The method of claim 17, wherein the step (c) comprises:
   controlling, in response to a preset touch input applied to at least one of the at least one icon corresponding to the at least one communication module, the preset application to be executed through the communication module corresponding to the at least one icon with the preset touch input applied thereto.

* * * * *